United States Patent [19]

Trey

[11] 3,845,994
[45] Nov. 5, 1974

[54] PLAIN BEARING WITH HIGH LOAD CAPACITY, PARTICULARLY FOR BORING TOOLS WITH CUTTING WHEELS

[75] Inventor: Roger Trey, Tarbes, France
[73] Assignee: Creusot-Loire, Paris, France
[22] Filed: Apr. 9, 1973
[21] Appl. No.: 349,045

[30] Foreign Application Priority Data
Apr. 25, 1972 France .............................. 72.14609

[52] U.S. Cl................................. 308/8.2, 308/240
[51] Int. Cl. ............................................ F16c 33/66
[58] Field of Search ................ 252/26; 308/8.2, 239

[56] References Cited
UNITED STATES PATENTS
3,350,307  10/1967  Brown.................................. 252/25
3,476,446  11/1969  Neilson............................ 308/240
3,532,623  10/1970  Groszek............................... 252/26

Primary Examiner—Charles J. Myhre
Assistant Examiner—Frank Susko
Attorney, Agent, or Firm—Cameron, Kerkam, Sutton, Stowell & Stowell

[57] ABSTRACT

A plain bearing with high load capacity for boring tools with cutting wheels has a spindle attached to the body and a rotary cutting wheel mounted on the spindle. A lubricant reservoir supplies lubricant to the bearing surfaces between the spindle and the cutting wheel. The grease contains fine particles of at least one frictional material which is relatively soft compared to the hard materials of the bearing surfaces. The bearing surfaces of the cutting wheel has grooves around its surface with the rear sides of the grooves in the direction of rotation being substantially perpendicular to the bearing surfaces.

3 Claims, 6 Drawing Figures

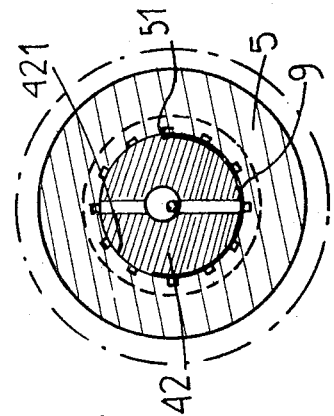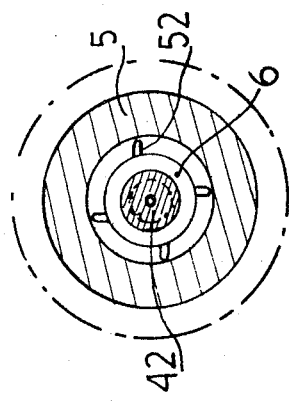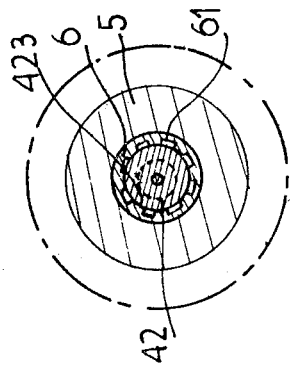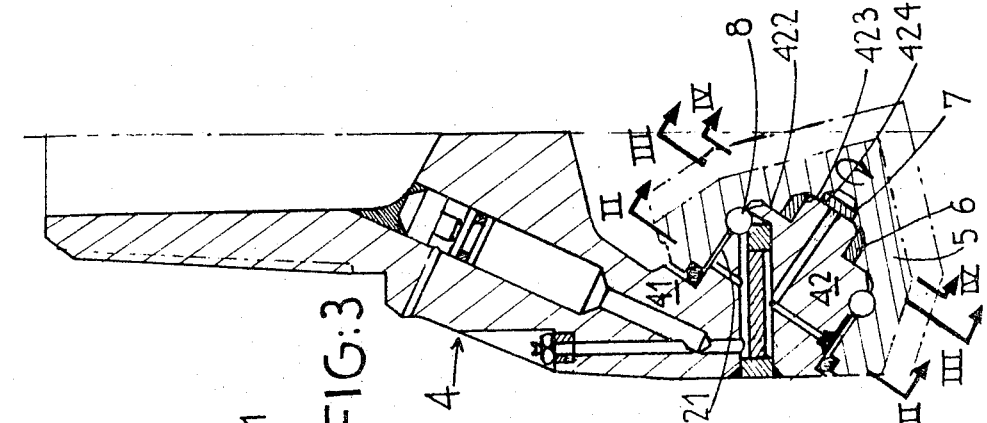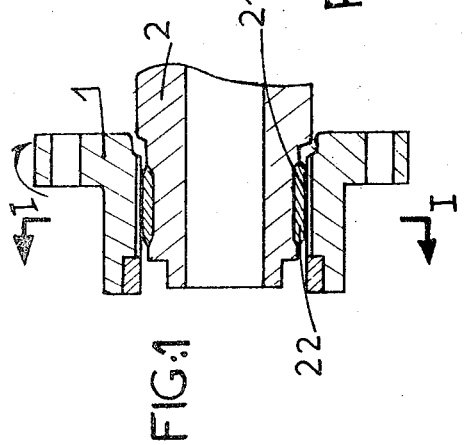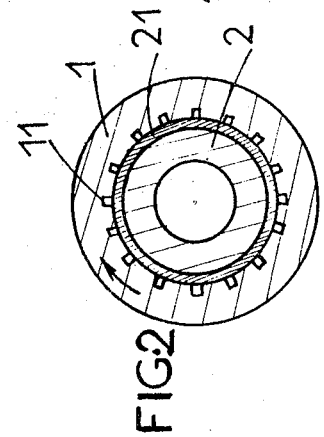

PLAIN BEARING WITH HIGH LOAD CAPACITY, PARTICULARLY FOR BORING TOOLS WITH CUTTING WHEELS

The present invention relates to a plain bearing which can operate under high loads of the radial type (carrier bearing) or of the longitudinal type (thrust bearing). This bearing is particularly for use in mounting the rotary cutting wheels of the triconical bits used for boring operations.

The importance of the value or the load applied to a plain bearing is known. For lubricated plain bearings, the factor equal to the quotient of the load times the projected surface area (diameter x length) of the bearing, also designated by unit pressure p, is used conventionally with the rotational velocity of the spindle,... to determine the characteristics of the said bearings. The unit pressure factor is of relevance to heating, the state of lubrication, wear and for the selection of contacting materials. Thus, for example, the smaller the unit pressure factor p, the more fluid the lubricant can be and the more the lubrication tends to be hydrodynamic. In fact, the unit pressure p is limited by the operating conditions. The factors which determine the unit pressure, i.e., the load and the dimensions of the bearing, are often imposed or limited, and factor p can attain considerable values. If, in addition, the bearing has a low operating speed, the conventional lubrication conditions and known materials and construction characteristics are no longer sufficient. An example of these severe operating conditions is provided by the plain bearings of the the triconical bits used for boring. The loads are large, the speeds small and the dimensions of the bearings limited by the dimensions of the cutting wheels. In these severe operating conditions, frictional metals are of limited use. Certain very hard, antifrictional alloys are nevertheless suitable for high pressures. Among these there are in particular aluminium bronzes or cadmium-silver alloys.

Boring tools with cutting wheels generally have a body provided with a thread for connection to a boring pipe and rigidly connected to three cutting wheel support axes which are directed downwards. The cutting wheels are rotationally guided on their axes by rolling bearings or plain bearings. Thrust bearings take the strains applied to the cutting wheels. Ball-bearings mounted between the cutting wheels and the support axes retain the cutting wheels and take thrusts.

Tools provided with rolling bearings have dimensional limitations. Boring tools with coventional rolling bearings also have limited service lives, in view of the operating conditions.

Attempts have been made to increase the service lives of the tools. Attempts have been made to make them able to bear high loads, high rotational velocities and high temperatures, in a corrosive and abrasive environment.

Thus U.S. Pat. No. 3,235,316 of Feb. 15, 1966 describes a boring tool provided with cutting wheel guide bearings having alternated zones of a hard metal having good resistance to abrasion and a soft metal such as silver having anti-seizing characteristics.

A boring tool has also been proposed, which has cutting wheel guide bearings lubricated by a grease containing particles of an anti-friction material such as silver within a limit of 15 percent, one bearing surface of each of the bearings being roughened to retain the particles of the said anti-friction material.

The purpose of the present invention is to provide a plain bearing which enables long service life to be obtained under high unit pressure, by means of good resistance to abrasion and seizing.

The plain bearing in accordance with the invention is essentially characterised by the fact that the rubbing surfaces are lubricated by a grease, which is itself known, containing fine particles of at least one friction material which is soft relative to the hard metallic materials of the rubbing organs and has good resistance to seizing by insolubility relative to the said materials.

In accordance with an important feature of the invention, remarkable results are obtained when the rotary organ has grooves which are distributed around the whole frictional surface and the rear sides of which, with reference to the relative direction of travel of the said organ relative to the other, are substantially perpendicular to the frictional surface.

FIG. 1 shows a plain bearing in accordance with the invention, in section.

FIG. 2 is a section along the line I—I of the bearing shown in FIG. 1.

FIG. 3 shows a triconical bit having bearings in accordance with the invention.

FIGS. 4, 5 and 6 show sections along the lines II—II, III—III, and IV—IV respectively of FIG. 3.

The invention results from the discovery that the use, in a plain bearing, of a grease consisting of the usual, known components of a conventional grease, and fine particles of a frictional material which is soft relative to the hard metallic materials of the rubbing organs and which has good resistance to seizing by insolubility of the said materials, considerably improves the capabilities of the bearing under high loads.

The rubbing surfaces of the bearing (the axis and the outer ring) consist of hard materials. When lubrication is provided by an ordinary grease, seizing would tend to be produced between the rubbing surfaces. It is generally agreed that seizing results from micro-welds between the materials of the rubbing surfaces. Friction weldability occurs when one of the materials is soluble in the other. Surface combinations are therefore sought generally which prevent seizing. It may therefore be thought that the interposition between the rubbing surfaces of a mixture comprising the grease and a material which is insoluble with at least the material of one of the said surfaces would avoid the above-mentioned welding phenomena. The resistance to seizing of the bearing is then good, while the wear of the rubbing surfaces remains small as a result of their hardness and while the coefficient of friction remains small.

The resistance to seizing of different materials against metals, particularly steel, is known. Classifications according to the property are given by certain authors, the insolubility of the metal in the rubbing organ in the metal of the other rubbing organ being put forward. The material forming part of the grease composition can thus be one of the metals of the group comprising germanium, silver, indium, tin, antimony, thallium, lead, bismuth, cadmium, copper, or an alloy of these metals. The material with anti-seizing properties, which is insoluble in the hard metallic materials of the rubbing organs, can be molybdenum disulphide or another met-alloid having these properties. The advantage is, in fact, known of the metal-metalloid surface couples on seizing, friction weldability not occurring with these combinations. This capability leads to conception of incorporation of compounds such as molybdenum disulphide in the grease, this combination being known in itself, moreover.

The finely-divided metal with anti-seizing properties is preferably in the form of flakes, of a maximum average length of a few dozens of microns and very thin.

The grease is prepared from a grease with addition of known, solid lubricant, in which the addition of metal particles is included. The preferred modus operandi consists of inroducing the metal particles into the grease by cold, hand mixing of short duration. Other modi operandi may also be suitable.

At least one of the rubbing surfaces of the bearing must be made of a hard metal, the grease in accordance with the invention preventing any seizing with the other rubbing surface. Wear of the fixed rubbing organ is localised on the load side, while the wear of the rotating organ is regularly distributed. The rubbing organ must therefore be made of a hard material, more especially on the load side.

The hard rubbing surfaces, having good resistance to wear, can be made of heat-treated cement steel, which may or may not have undergone chemical anti-seize sulphuration or phosphatization treatment producing the known binary metal-metalloid combination for preventing welds and, therefore, seizing.

The rubbing surfaces of the bearing can also be made of a cobalt-based super-alloy. Yet again, it is possible to envisage an anti-friction metal of sufficient hardness for the rubbing surfaces.

Reference will now be made to FIGS 1 and 2, which show a plain bearing which, associated with the grease in accordance with the invention, enables remarkable results to be obtained. It includes an outer body 1 rotating in the direction of the arrow on a fixed axis 2. Fixed part 2, which is subject to local wear essentially in the contact zone situated on the load side, has a very hard outer surface to resist this wear. For this purpose, fixed axis 2 has a loading 22 of a hard material of the super-alloy type.

The bore of rotary piece 1 has uniformly distributed grooves 11, the rear sides 111 of which, in accordance with the direction of relative motion, indicated by the arrow, of mobile part 1 relative to fixed part 2, are substantially perpendicular to the rubbing surface. The great importance to the performance of the bearing of the removal of metal particles due to wear is known. In plain bearings having an anti-friction bush, absorption of these particles is facilitated by the soft metal matrix. It may be thought that the particles torn from the rubbing surfaces are collected in these grooves, which would explain the remarkable performance of the bearings in accordance with the invention. Cyma grooves, such as those used for forming oil channels, would cause engagement of the metallic particles between the rubbing surfaces. As has already been stressed, collection grooves 11 are advantageously formed in the bore of rotary part 1. It will be understood that the different grooves 11 of mobile part 1 all run successively into the loaded zone. It may be thought that they could not be formed in the loaded portion of fixed part 2 and that, distributed around the whole outer surface of the said part, particle elimination efficiency would be reduced.

Notable improvements in the service life of plain bearings made in accordance with the invention have been revealed by trials on test-pieces similar to those described with reference to FIGS. 1 and 2, lubricated with the grease in accordance with the invention. The following experimental conditions were imposed by the different trials:

Fixed shaft 2: diameter 60 mm — bearing length 26 mm — outer surface loaded with cobalt super-alloy.

Outer, grooved, rotating ring 1: diameter 60 mm, — of tempered cement steel.

Rotational velocity of rotating ring: 60 rmp.

Static load applied: 8 metric tons.

Grease composition: silver filler in the form of flakes = 5% − 95% + Solid lubricant $MoS_2$ grease (remainder).

In a trial during which 600,000 revolutions were performed, the grease used containing 50 percent of silver, the wear measured on ring 1 was 0.02 mm for 100,000 revolutions and 0.05 mm on the spindle. Shorter trials (200,000 revolutions) with greases containing 10 and 20 percent respectively of silver filler shows wear of the same order at 100,000 revolutions. A trial with a 5 percent grease shows wear of the same order at first, but temporary seizing makes this wear become more and more irregular and its appreciation become very inexact. A trial with a grease containing 2 percent of silver, stopped at 300,000 revolutions, revealed average wear at 100,000 revolutions which was double the preceeding average wear; traces of seizing for this percentage then appearing. It may be thought that contact between the rubbing surfaces can be avoided sufficiently by the grease which does not contain sufficient silver filler. Trials with a grease having a 95 percent filler give the wear rates mentioned above.

FIG. 3 shows a triconical bit having bearings in accordance with the invention. In known manner, this tool includes a body 4, extended downwardly by several arms such as 41 each provided with an axis such as 42 on which a cutting wheel such as 5 is mounted for free rotation, then cutting wheel is guided on axis 42 by two carrier bearings with cylindrical bearing surfaces 421 and 423 taking transversal strains, the axis bearing in the bores of the cutting wheel and ring 6 fitted into the said cutting wheel. Strains axially of axis 42 are taken by two thrust bearings or step bearings, the rubbing surfaces of which are 421 and 424, stop 7, which is fitted into the cutting wheel, rubbing against surface 424. Ball bearings 8, running in bearing tracks in the shaft and the cutting wheel, have the double task of taking strains and retaining the cutting wheel on its axis.

One of the bearings of the carrier type, shown in section in FIG. 4, the guide surface of which is indicated by 421, is formed firstly of axis 42, having a zone 9 of hard metallic material on the load side, and secondly of cutting wheel 5, in which are formed grooves 51 of rectangular cross section, the task of which has been described above. Similarly, to form the bearing, the bearing surface of which is 423 and which is shown in more detail in FIG. 6, grooves 61 of rectangular cross section are formed in ring 6.

The thrust bearing, formed between axis 42 and cutting wheel 5, and the rubbing surface of which is indicated by 422, is shown in FIG. 5, moreover. Grooves 52 with sides perpendicular to the rubbing surface are formed in cutting wheel 5.

By way of guidance, the grooves can have a width of the order of 1 to 4 mm and a depth of 0.5 to 2 mm.

Of course, it is possible to conceive modifications and improvements to detail and to consider the use of equivalent means, without departing from the scope of the invention. Thus, it is possible to insert rings between between the cylindrical bearing surfaces of axis 42 and cutting wheel 5. In the embodiment described above, the grooves formed in one of the rubbing organs are rectangular in shape. They can also have a triangular or other cross section, the rear side being substantially perpendicular to the rubbing surface. Grooves with rectangular cross sections, are however, necessary for bearings used with two directions of rotation.

I claim:

1. Plain bearing with high load capacity, for boring tool with cutting wheels including:
   a tool body which can be connected to a string of rods,
   at least one spindle rigidly attached to the body and provided with at least one bearing surface,
   at least one rotary cutting wheel mounted on a spindle provided internally with at least one rubbing surface,
   a lubricant reservoir supplying grease to the rubbing surfaces,
   at least one ball-type bearing for immobilizing a cutting wheel on its spindle,
   the grease containing fine particles of at least one frictional material which is soft relative to the hard materials of the rubbing organs and has good resistance to seizing by insolubility relative to at least one of the said materials,
   at least one of the cutting wheels having grooves around the whole of at least one rubbing surface, the rear sides of said grooves considered in the direction of rotation of the said organ being substantially perpendicular to the rubbing surface.

2. Plain bearing with high load capacity, as described in claim 1, particularly for boring tools with cutting wheels the grease containing at least 15 percent of at least one of the metals selected from the group consisting of germanium, silver, indium, tin, antimony, thallium, lead, bismuth, cadmium and copper.

3. Plain bearing with high load capacity as described in claim 1 particularly for boring tools the particles having a lamellar structure, the largest dimensions being a few dozen microns at the most.

* * * * *